US010091689B2

(12) United States Patent
Chakra et al.

(10) Patent No.: US 10,091,689 B2
(45) Date of Patent: *Oct. 2, 2018

(54) WIRELESS CHANNEL AND/OR BAND ARBITRATION

(71) Applicant: International Business Machines Corporation, Armonk, NY (US)

(72) Inventors: Al Chakra, Apex, NC (US); Jonathan Dunne, Dungarvan (IE); Liam Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,097

(22) Filed: Nov. 29, 2016

(65) Prior Publication Data

US 2017/0086096 A1 Mar. 23, 2017

Related U.S. Application Data

(63) Continuation of application No. 14/861,036, filed on Sep. 22, 2015.

(51) Int. Cl.
*H04W 28/02* (2009.01)
*H04W 24/08* (2009.01)
(Continued)

(52) U.S. Cl.
CPC ......... *H04W 28/0289* (2013.01); *H04L 43/16* (2013.01); *H04W 24/02* (2013.01)

(58) Field of Classification Search
CPC .... H04W 28/0289; H04W 24/08; H04L 43/16
(Continued)

(56) References Cited

U.S. PATENT DOCUMENTS 7,031,266 B1 * 4/2006 Patel ..................... H04L 45/02
370/254
7,787,416 B2 8/2010 Gidwani
(Continued)

FOREIGN PATENT DOCUMENTS

| JP | 5663083 B2 | 2/2015 |
| WO | 2013040558 A2 | 3/2013 |
| WO | 2013066314 A1 | 5/2013 |

OTHER PUBLICATIONS

Aslam et al., "Streaming-aware Channel Utilization Improvement for Wireless Home Networks", IEEE Transactions on Consumer Electronics, vol. 58, No. 1, Feb. 2012, pp. 69-77.
(Continued)

*Primary Examiner* — Ricky Ngo
*Assistant Examiner* — Ellen Kirillova
(74) *Attorney, Agent, or Firm* — Fusheng Xu; Stephen R. Yoder; William H. Hartwell

(57) ABSTRACT

A computer implemented method comprising receiving, for each of a plurality of wireless routers, location, connection time, wireless band and wireless channel information, calculating, for each of the plurality of wireless routers, a congestion quotient from the received location, connection time, wireless band and wireless channel information, the congestion quotient defining the likelihood of destructive interference at the respective wireless router, identifying a wireless router with a congestion quotient greater than a predetermined threshold, determining changes in wireless band and/or wireless channel for the identified wireless router that would lower the congestion quotient for the identified wireless router, and transmitting the determined changes to the identified wireless router.

5 Claims, 5 Drawing Sheets

(51) Int. Cl.
   *H04L 12/26* (2006.01)
   *H04W 24/02* (2009.01)
(58) Field of Classification Search
   USPC ........................................................ 370/329
   See application file for complete search history.

(56) References Cited

U.S. PATENT DOCUMENTS

| | | | |
|---|---|---|---|
| 8,582,584 B2 | 11/2013 | Rieger et al. | |
| 2003/0081559 A1* | 5/2003 | Matuoka | H04L 12/1877 370/252 |
| 2005/0208949 A1 | 9/2005 | Chiueh | |
| 2012/0002567 A1* | 1/2012 | Sun | H04W 28/16 370/252 |
| 2014/0140295 A1* | 5/2014 | Manssour | H04L 5/0032 370/329 |
| 2014/0269524 A1 | 9/2014 | Xiao et al. | |
| 2014/0376375 A1* | 12/2014 | Joo | H04L 41/12 370/235 |
| 2015/0040197 A1 | 2/2015 | Brown et al. | |
| 2015/0141027 A1* | 5/2015 | Tsui | H04W 52/243 455/452.1 |
| 2016/0080954 A1* | 3/2016 | Hedayat | H04B 17/318 370/252 |

OTHER PUBLICATIONS

Farproc, "Wifi Analyzer", Printed Aug. 25, 2015, 3 pages, <https://play.google.com/store/apps/details?id=com.farproc.wifi.analyzer&hl=en>.

Ghittino et al., "WiFi network residual bandwidth estimation: a prototype implementation", 2012 9th Annual Conference on Wireless On-Demand Network Systems and Services (WONS), 2012, pp. 43-46.

Huang et al., "WiFi-BA: Choosing Arbitration over Backoff in High Speed Multicarrier Wireless Networks", 2013 Proceedings IEEE INFOCOM, Apr. 14-19, 2013, pp. 1375-1383.

"Configure Multiple SSIDs with One Router", kam, Printed Aug. 25, 2015, 8 pages, <http://www.dotkam.com/2008/10/02/configure-multiple-ssids-with-one-router/>.

"How to Find the Best Wi-Fi Channel for Your Router on Any Operating System", Printed Aug. 25, 2015, 5 pages, <http://www.howtogeek.com/197268/how-to-find-the-best-wi-fi-channel-for-your-router-on-any-operating-system/>.

"NetStumbler", Printed Aug. 25, 2015, 1 page, Copyright Netstumbler.com 2005-2014, <http://www.netstumbler.com/downloads/>.

Chakra et al., "Wireless Channel and/or Band Arbitration", U.S. Appl. No. 14/861,036, filed Sep. 22, 2015, pp. 1-21.

IBM Appendix P: "List of IBM Patents or Patent Applications to be Treated as Related", Dated Nov. 29, 2016, 2 pages.

* cited by examiner

WIRELESS CHANNEL AND/OR BAND ARBITRATION

FIELD OF INVENTION

The present invention relates generally to wireless technology, and more particularly to managing congestion amongst wireless routers.

BACKGROUND

Wireless communication involves the transmission of information over a distance without help of wires, cables or any other forms of electrical conductors. The transmitted distance can be anywhere between a few meters and thousands of kilometers. Wireless networks utilize radio waves and/or microwaves to maintain communication channels between computers and other network devices. Wi-Fi is the most common form used in homes including wireless access points, routers, and adapters. (Note: the term "Wi-Fi" may be subject to trademark rights in various jurisdictions throughout the world and are used here only in reference to the products or services properly denominated by the marks to the extent that such trademark rights may exist.) Wireless routers are the foundation of a wireless network. Broadband routers generally combine the functions of a traditional switch, firewall, and wireless access point. Wireless hotspots provide Internet access using Wi-Fi access points installed in airports, hotels, and other public places.

SUMMARY

According to a first aspect of the present invention, a computer implemented method is provided comprising receiving, for each of a plurality of wireless routers, location, connection time, wireless band and wireless channel information; calculating, for each of the plurality of wireless routers, a congestion quotient from the received location, connection time, wireless band and wireless channel information, the congestion quotient defining the likelihood of destructive interference at the corresponding wireless router; identifying a wireless router with a congestion quotient greater than a predetermined threshold; determining changes in wireless band and/or wireless channel for the identified wireless router that would lower the congestion quotient for the identified wireless router; and transmitting the determined changes to the identified wireless router.

According to a second aspect of the present invention, a system is provided comprising a processor arranged to receive, for each of a plurality of wireless routers, location, connection time, wireless band and wireless channel information; calculate, for each of the plurality of wireless routers, a congestion quotient from the received location, connection time, wireless band and wireless channel information, the congestion quotient defining the likelihood of destructive interference at the corresponding wireless router; identify a wireless router with a congestion quotient greater than a predetermined threshold; determine changes in wireless band and/or wireless channel for the identified wireless router that would lower the congestion quotient for the identified wireless router; and transmit the determined changes to the identified wireless router.

According to a third aspect of the present invention, a computer program product is provided for controlling a server, the computer program product comprising a computer readable storage medium having program instructions stored thereon, the program instructions when executed by a processor to cause the processor to receive, for each of a plurality of wireless routers, location, connection time, wireless band and wireless channel information; calculate, for each of the plurality of wireless routers, a congestion quotient from the received location, connection time, wireless band and wireless channel information, the congestion quotient defining the likelihood of destructive interference at the corresponding wireless router; identify a wireless router with a congestion quotient greater than a predetermined threshold; determine changes in wireless band and/or wireless channel for the identified wireless router that would lower the congestion quotient for the identified wireless router; and transmit the determined changes to the identified wireless router.

BRIEF DESCRIPTION OF THE DRAWINGS

Preferred embodiments of the present invention will now be described, by way of example only, with reference to the following drawings, in which:—

DETAILED DESCRIPTION

Figure 1:
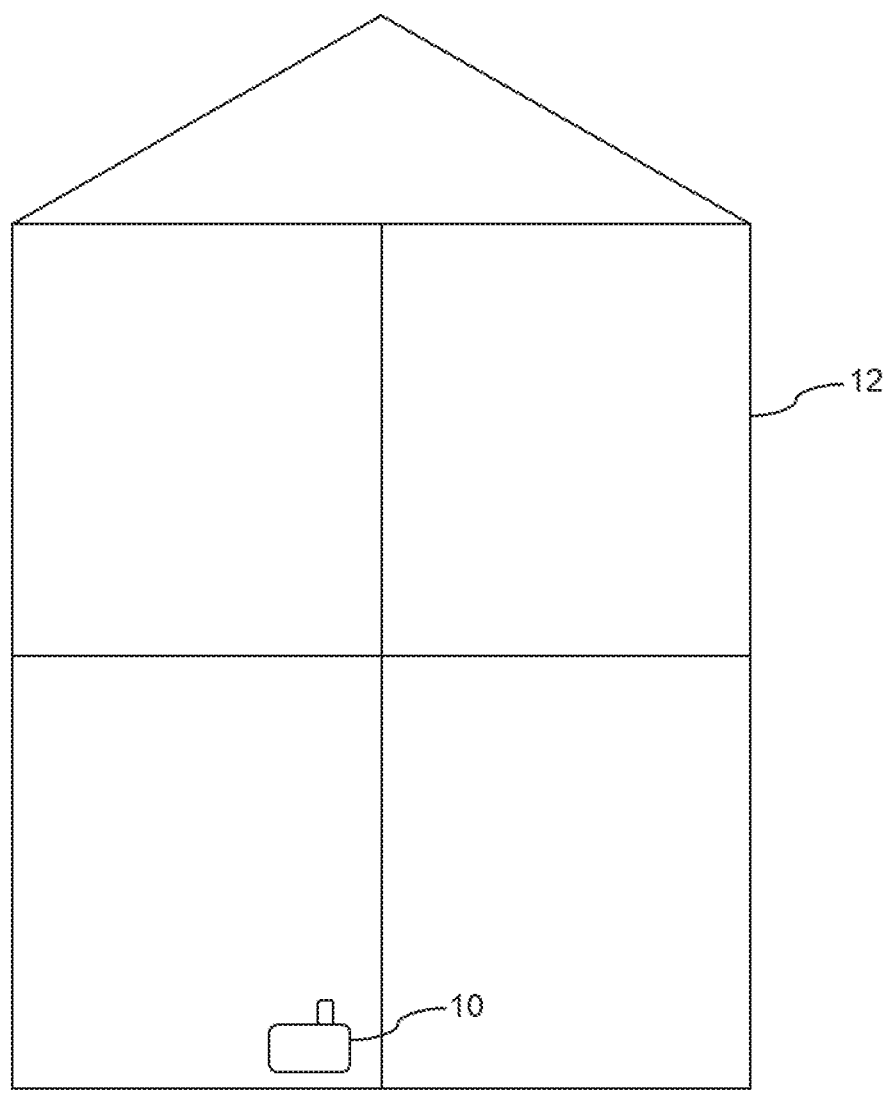
FIG. 1 is a schematic diagram of a house with a wireless router in one embodiment according to the present invention.

FIG. 1 shows a wireless router 10 within a house 12. Broadband and Wi-Fi services are often present in an end user's home. Many of such services and applications that are used rely on a network connection. For example, in a typical family home users may consume VOD (video on demand), IPTV (television over the Internet) and/or VoIP (voice over IP, i.e. phone dialling over the Internet) services alone, as well as additional services. The users must have mobile and other Wi-Fi services. As users in urban areas and cities increase, uptake in broadband services is continually increasing. In some embodiments of the present invention, the router 10 connects to a wide area network such as Internet through a fixed line telephony system and communicates with local devices via a local wireless connection such as Wi-Fi.

As both users and Wi-Fi usage increase, more routers with Wi-Fi capability are deployed in each user's home. One of the difficulties with this arrangement is that modern home router systems typically allow Wi-Fi to be broadcast on a single channel only. However, if different Wi-Fi routers are deployed in close proximity and are using a similar Wi-Fi channel, this can lead to poor quality of service for all end users as a result of destructive interference. It is possible to perform a number of manual workarounds, for example, a user can run a Wi-Fi analysis tool and determines which channels are in use. The user can then determine which channels are overloaded and which channels have relatively little usage. With this knowledge the user can then manually change their channel and hopes the channel does not become overloaded. Additionally, most Wi-Fi routers have an option to set the Wi-Fi channel to automatically choose which is supposed to pick the least congested channel. However, in practice this feature does not appear to work well as expected.

In some embodiments of the present invention, a system and method are provided in home 12 that can improve the use of wireless routers 10 by reducing the destructive interference. In the system, router 10 has fewer channel changes compared to many individual routers or networking devices that manage local channel changes. Further, router 10 can determine which devices connect including where and if there is a temporal movement in coverage. Additionally, router 10 is aware of the time of connectivity when a device connects. The Wi-Fi router 10 can assign a provisional Wi-Fi band and/or channel, and necessary information is communicated back to a central server (not shown in FIG. 1). The central server system determines a preferred channel for a given household based on a quality of service value. The central server system arbitrates in real-time as more or less different routers are added to a geographical location.

Figure 2:
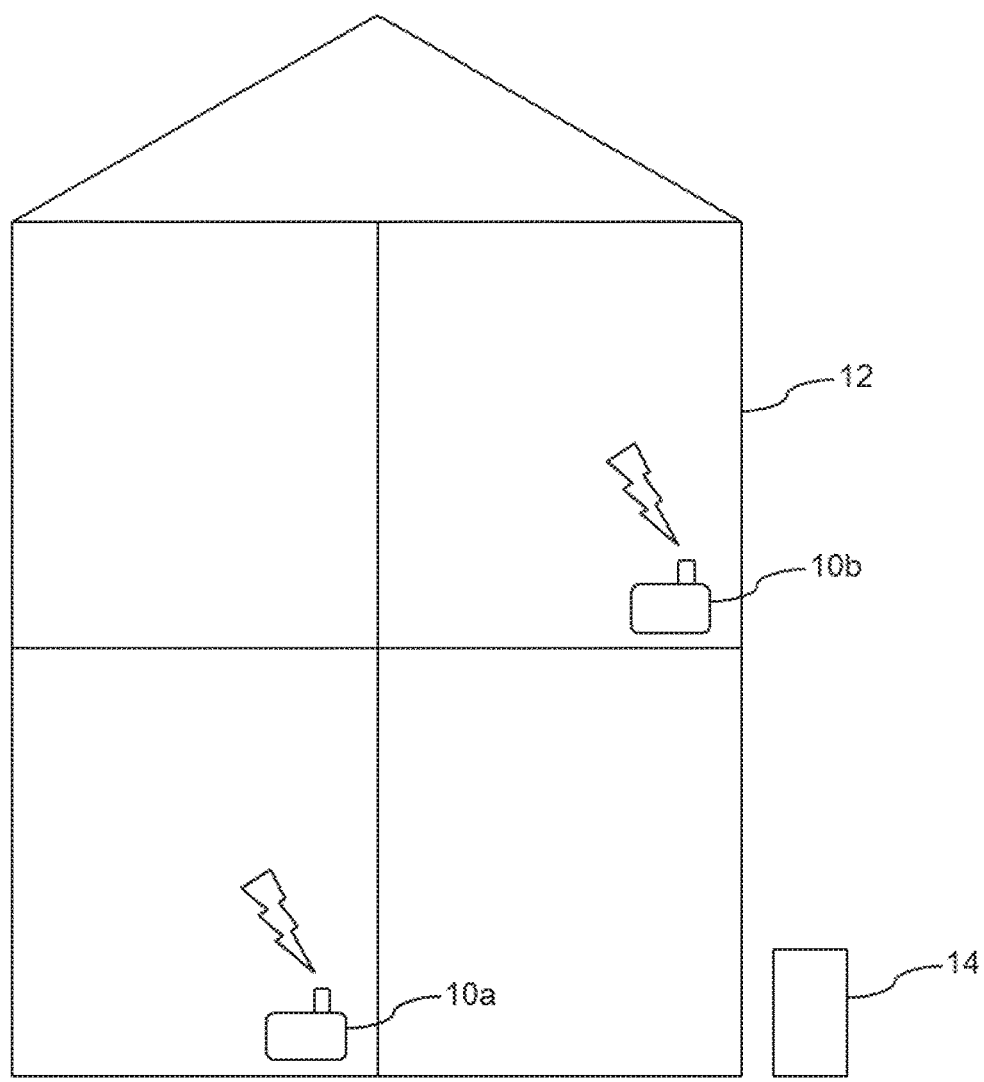
FIG. 2 is a schematic diagram of two houses with corresponding wireless routers in one embodiment according to the present invention.

As home broadband services permeate to more households and Wi-Fi hotspots become more and more available, there is a need to ensure that congestion of services does not become a problem. In densely populated locations, the concern is more immediate as the large number of wireless routers increase the likelihood of destructive interference. For example, as shown in FIG. 2 according to some embodiments of the present invention, if two users in opposite sides of a semi-detached house 12 use routers 10a and 10b that are set to the same Wi-Fi band and/or channel, then the routers 10a and 10b will potentially suffer congestion, especially if additional local users have their routers (not shown in FIG. 2) configured on the same band.

Each router 10 (e.g., routers 10a and 10b) collects a number of metrics such as the number and type of devices that connect, the Wi-Fi channel and band required, and/or connectivity and duration of connection statistics. Each router 10 aggregates this information and returns the obtained information to a remote central server 14 for additional analysis. The central server 14 performs analysis on router configurations within a local region and calculates a congestion quotient for each router 10. The central server 14 arbitrates Wi-Fi band and/or channel in the local region based on the congestion quotients. Further, the central server 14 arbitrates dynamically as routers are added and removed from the local region. The central server 14 instructs the routers 10 to change their band and/or channel accordingly.

The congestion quotient can be represented in the form of a visual queue so that system administrators can visually determine the level of congestion of router devices, for example, in the form of red=highly congested, yellow=moderately congested and green=low congestion. Each end user would see the congestion level of their own router 10. A web service could be provided, for example, where users are able to access the information related to their specific wireless router 10 and the level of congestion can be presented as a single colour as discussed, so that a user can see the calculated level of congestion for their own router 10.

Figure 3:
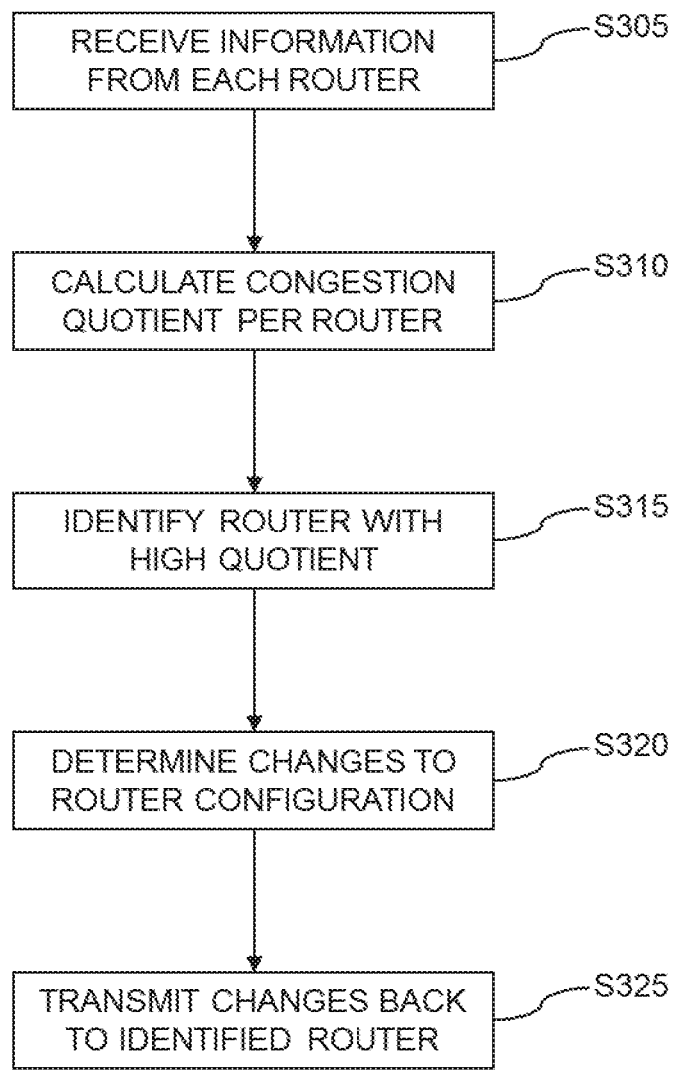
FIG. 3 is a flowchart of a method of operating a server according to the present invention.

FIG. 3 is a flowchart depicting a first method according to the present invention. In step S305, for each of a plurality of wireless routers (e.g., routers 10a and 10b in FIG. 2), information on location, connection time, wireless band and wireless channel is received. Each router will aggregate this information and transmit the information to a central server (e.g., the central server 14 in FIG. 2). The location information may be a GPS (global positing system) co-ordinate, for example. The connection time can be the average number of daily hours that each router is in use, for example, taken as an average over a week or month. The wireless band and wireless channel information are technical data concerning the operation of a specific router in question from the plurality of wireless routers.

Step S310 comprises calculating, for each of the plurality of wireless routers, a congestion quotient based on the received location, connection time, wireless band and wireless channel information. The congestion quotient defines the likelihood of destructive interference at a corresponding wireless router. In some embodiments of the present invention, the congestion quotient can be calculated as a linear function that defines a probability that a specific router will suffer from destructive interference at any time. Each router can be compared directly with the remaining routers of the plurality of routers that are physically adjacent as determined by the location information. If they are using the same band and channel, then the likelihood of congestion will depend upon the average hours being used. "Adjacent" can mean routers within a specific range (such as ten meters), or can be in the sense of which routers are the closest orthogonally.

Step S315 identifies a wireless router with a congestion quotient greater than a predetermined threshold. Step S320 comprises determining changes in wireless band and/or wireless channel for the identified wireless router, and the changes would lower the congestion quotient for the identified wireless router. In step S325, the determined changes to the identified wireless router is transmitted back from the central sever (e.g., the central server 14 in FIG. 2) to the identified router (e.g., the routers 10a or 10b in FIG. 2). For example, the central server determines any router of the plurality of routers that has a congestion quotient above a predetermined level, such as 50%. The central server then determines the preferred channel and/or band changes to the corresponding router in question, and transmits the changes to the corresponding router such that the corresponding rougher change its band and/or channel accordingly.

For example, as shown in FIG. 2, the two routers 10a and 10b may be on the same band and channel. One of the routers (e.g., router 10a) is on for an average of two hours a day, while the other router (e.g., router 10b) is on for an average of fourteen hours a day. The information about location, usage, band and channel is sent from both routers to the central server 14, which calculates a congestion quotient for each router. Router 10a will have a quotient of 0.58 representing a 58% chance of congestion (since the adjacent (closest) router (router 10b) is on for fourteen hours out of twenty-four hours) and router 10b will have a quotient of 0.08 representing an 8% chance of congestion (since the adjacent router 10a is on for two hours out of twenty-four hours).

The central server 14 will instruct router 10a to change channel to a new channel number that will ensure that the likelihood of congestion is reduced. This example in FIG. 2 is simplified as the calculation of the congestion quotient may take into account the daytime that the routers are active for which time period users do not use the router, since it is common for users to access their wireless routers at the same time of day (usually the evening). However, if on average the two routers 10a and 10b are being used at different times of day, even though they are on the same channel, then the congestion quotient for both routers 10a and 10b would be lower than the threshold of 50% which determines whether the central server 14 take actions to lower the chance of destructive interference.

In a more complex situation, for example, where there are six routers in a locality, two of which have a congestion quotient above the predetermined threshold of 50%, then a more complicated process of determining the changes to be made will need to be carried out. In general, the central server 14 will consider changing the channel of a wireless router first, as this is less likely to cause configuration problems in the home using the router. In some embodiments of the present invention, for each router 10 that needs changes, the routers 10 are considered individually in turn. If the channel of a router in question is the same or adjacent to the channel of another physically adjacent router (which is highly likely since this will drive a higher congestion quotient), then the server 14 will consider changing the channel of the router to a channel number that is not in use by any other physically adjacent router. Since there are twelve channels in the Wi-Fi system, there will always be at least one unused channel available that can be selected. The same process will be carried out for the second router with the high congestion quotient that is part of the locality. Additionally, band changes will be made, if the only available channel(s) is adjacent in number to an existing channel in question, which still will lead to some destructive interference. In this case, if the two routers that need to be changed are both on the longer range band 2, 4 Ghz, then in addition to changing the channel, they can be instructed to change to the 5 Ghz band. Band changes will normally be used if channel changes cannot eliminate the problem of interference.

In some embodiments of the present invention, each of the Wi-Fi routers 10 has a software agent which allows for the gathering of local information concerning connected Wi-Fi devices, and connectivity times and durations. Each Wi-Fi router aggregates this information and sends back to the central sever 14 for additional analysis. The central server 14 looks at the plurality of Wi-Fi router within a specific local region and a congestion quotient is then calculated for each routing device 10. The central server 14 then arbitrates which Wi-Fi channel is preferred appropriate to each router 10 based on a factorial analysis of gathered data and the congestion quotient. The central server 14 continues to receive metrics dynamically for each router 10 and in turn arbitrates in real-time as devices and/or routers are added and/or removed.

Figure 4:
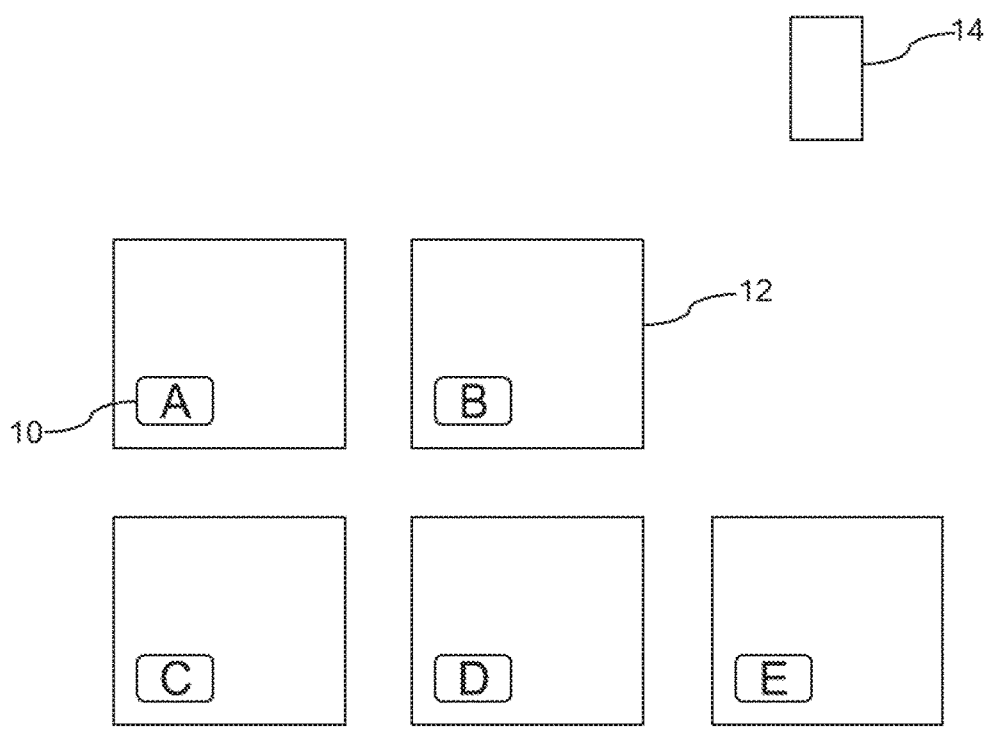
FIG. 4 is a schematic diagram of five houses with corresponding wireless routers in one embodiment according to the present invention.

FIG. 4 gives an example system involving five routers 10 (A, B, C, D, and E) according to some embodiments of the present invention, which are located within five separate houses 12 that are in the same locality. Each router 10 gathers data locally over a predetermined time period such as a week. This data will comprise the details of the local devices (such as mobile phones and laptops, etc.) that connect to a specific wireless router 10 and the times and durations of the connections to the specific router 10. This information is transmitted to the central server 14, along with information concerning the band and channel that are used by the routers 10 as well as their locations. All of the routers 10 shown in the FIG. 4 will perform this operation, providing the server 14 with the necessary information to arbitrate the channels and bands being used.

The channel data represents the centre frequency used for the wireless communications (Wi-Fi currently uses fourteen channels) and destructive interference can occur on adjacent channels as well as on identical channels. The band data represents the data rate and range of the wireless signal, with higher data rates normally implying a short range of signal. The server 14 will calculate a congestion quotient for each of the wireless routers 10 for which data has been received. This calculation will be based on using data for physically adjacent routers (as defined by a 3-dimensional range such as ten meters), but will also take into account the band being used as a longer range signal will have a wider geographic spread and could therefore interfere with routers that are further away.

Table 1 shows the calculated congestion quotients for the routers 10 (A, B, C, D, and E) shown in FIG. 4 according to some embodiments of the present invention. The table 1 is populated by rows where each row represents a connected router. The five routers shown in the Table 1 are the five routers A to E shown in FIG. 4. The columns of the Table 1 are router name, GPS co-ordinates (location), average connection time, Wi-Fi band, Wi-Fi channel and congestion quotient, respectively. The Table 1 is created by the server 14 from the information received from the different routers 10 (A, B, C, D, and E). The last column is the congestion quotient being calculated by the server 14 from the information received. If any router reports new data or any routers are added or removed, then the congestion quotients are recalculated dynamically.

TABLE 1

Calculated congestion quotients for the routers shown in FIG. 4.

| Name | Location | Average time | Band | Channel | Quotient |
|---|---|---|---|---|---|
| A | x1, y1 | 4.5 hours | 2.4 Ghz | 6 | 0.55 |
| B | x2, y2 | 7.9 hours | 2.4 Ghz | 1 | 0.00 |
| C | x3, y3 | 12.7 hours | 2.4 Ghz | 6 | 0.35 |
| D | x4, y4 | 3.2 hours | 2.4 Ghz | 7 | 0.55 |
| E | x5, y5 | 6.5 hours | 5 Ghz | 8 | 0.15 |

The calculation of the congestion quotient by the server 14 can be carried out in a number of different ways, depending upon the implementation used by the server 14. In some embodiments of the present invention, a linear function can be used that considers a router and compares that router with the physically adjacent other routers. The identification of which other routers are adjacent is based on the location defined by the GPS co-ordinates and on the band being used. For example, bin FIG. 4, all orthogonally adjacent routers are capable of destructive interference. Also, since routers B and C both use the 2.4 Ghz band, they can interfere with each other, and are considered adjacent physically even though they are not orthogonally adjacent in this arrangement in FIG. 4. The router E uses the shorter range 5 Ghz band so does not interfere with router B although the reverse is not the case.

Once the server 14 has identified which routers are adjacent and may cause interference/congestion, then the congestion quotient can be worked out from the average connection time and the channels being used. For example, routers A and C in FIG. 4 both use channel 6 (as shown in Table 1), so there is a higher likelihood of congestion. Further router D being on channel 7 also potentially causes interference since adjacent channels can still provide destructive interference. The linear function computes the various factors involved and produces a congestion quotient for each of the routers. The congestion quotient represents a chance of destructive interference occurring on a scale of 0 to 1, for each of the wireless routers. In this case the routers A and D both have congestion quotients over 50%, thus may be instructed to change to a different channel that reduces the likelihood of interference.

Figure 5:
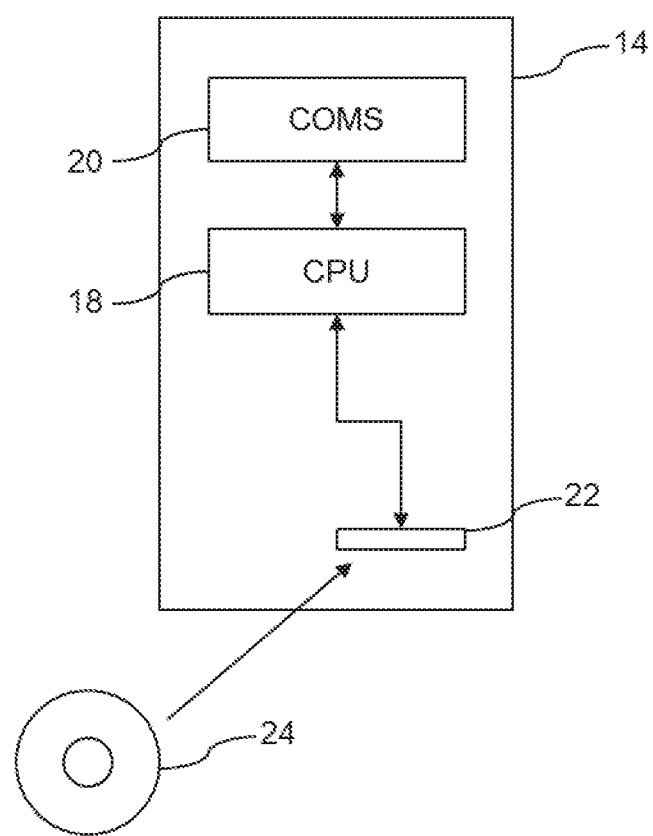
FIG. 5 is a schematic diagram of a server in one embodiment according to the present invention.

FIG. 5 shows a central server according to some embodiments of the present invention, such as the server 14 in FIGS. 2 and 4. the central server is a system that comprises a processor 18 and a network interface 20 connected to the processor 18, which connects to routers (e.g. routers 10 in FIG. 4), for example via a network such as the Internet. Also connected to the processor 18 is a local drive 22. The processor 18 is controlled according to a computer program product on a computer readable medium 24, for example, a CD-ROM. The computer program product comprises a set of instructions that are executed by the processor 18 in order to control the operation of the server 14.

The processor 18 is arranged to receive, for each of a plurality of wireless routers their location, connection time, wireless band and wireless channel information. The processor 18 is then able to calculate, for each of the plurality of wireless routers, a congestion quotient from the received location, connection time, wireless band and wireless channel information, the congestion quotient defining the likelihood of destructive interference at the respective wireless router. The processor 18 identifies a wireless router with a congestion quotient greater than a predetermined threshold, determines changes in wireless band and/or wireless channel for the identified wireless router that would lower the congestion quotient for the identified wireless router, and transmits the determined changes to the identified wireless router.

The processor 18 is arranged, in the preferred embodiment, when calculating, for each of the plurality of wireless routers, a congestion quotient from the received location, connection time, wireless band and wireless channel information, (where the congestion quotient defines the likelihood of destructive interference at the respective wireless router), to compare, for each of the plurality of wireless routers, connection time, band and channel information with physically adjacent routers (where adjacent is based on physical range or closest router). The processor 18 is arranged, when identifying a wireless router with a congestion quotient greater than a predetermined threshold, to identify a wireless router with a congestion quotient greater than a 50% chance of destructive interference at the respective wireless router. Any router that has a congestion quotient above 0.5 (on a scale of 0 to 1) will have a reconfiguration determined by the server 14. This will be in the form of a channel and/or band switch. For example, a channel may be chosen that is not in use by any physically adjacent router and/or the router may be requested to switch to a different band to avoid congestion. In this case, the processor 18 is arranged, when determining changes in wireless band and/or wireless channel for the identified wireless router that would lower the congestion quotient for the identified wireless router, to set the wireless band and/or wireless channel to be different from the wireless band and/or wireless channel of a physically adjacent router.

When making the determination of the congestion quotient the processor 18, when calculating, for each of the plurality of wireless routers, a congestion quotient from the received location, connection time, wireless band and wireless channel information, the congestion quotient defining the likelihood of destructive interference at the respective wireless router, assigns a percentage likelihood of destructive interference at the respective wireless router in respect of each of the received location, connection time, wireless band and wireless channel information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing wireless channels and/or bands, the method comprising:
   receiving, by one or more processors at a central server, from each of a plurality of wireless routers within a local region over a predetermined time period, information on location, number of connected local devices, type of the connected local devices, connection time, wireless band and wireless channel, wherein the plurality of wireless routers within the local region are using a same wireless band and/or wireless channel, and wherein each connected local device for which information is received utilizes one or more of the plurality of wireless routers for a network connection;
   calculating, by one or more processors at the central server, for each of the plurality of wireless routers within the local region, a congestion quotient from the received information on location, number of connected local devices, type of the connected local devices, connection time, wireless band and wireless channel, wherein the congestion quotient defines a likelihood of destructive interference at the corresponding each wireless router;
   identifying in real-time, by one or more processors at the central server, one or more wireless routers of the plurality of wireless routers within the local region with a congestion quotient greater than a predetermined threshold;
   determining, by one or more processors at the central server, changes in wireless band and/or wireless channel for the identified one or more wireless routers, wherein the changes lower the congestion quotient for the identified one or more wireless routers within the local region; and
   transmitting, by one or more processors at the central server, the determined changes to the identified one or more wireless routers within the local region.

2. The method of claim 1, wherein the step of calculating, by one or more processors at the central server, for each of the plurality of wireless routers within the local region, a congestion quotient, includes comparing, for each of the plurality of wireless routers, number of connected local devices, type of the connected local devices, connection time, band and channel information with physically adjacent routers.

3. The method of claim 1, wherein the step of identifying in real-time, by one or more processors at the central server, one or more wireless routers includes identifying a wireless router within the local region with a congestion quotient greater than a 50% chance of destructive interference at such wireless router.

4. The method of claim 1, wherein the step of calculating, by one or more processors at the central server, for each of the plurality of wireless routers within the local region, a congestion quotient includes assigning a percentage likelihood of destructive interference at the corresponding each wireless router with respect to each of the received location, number of connected local devices, type of the connected local devices, connection time, wireless band and wireless channel information.

5. The method of claim 1, wherein the step of determining, by one or more processors at the central server, changes in wireless band and/or wireless channel for the identified wireless router includes setting the wireless band and/or wireless channel of the identified wireless router to be different from the wireless band and/or wireless channel of a router physically adjacent to the identified wireless router.

* * * * *